United States Patent [19]
Schoeffler

[11] Patent Number: 5,627,710
[45] Date of Patent: May 6, 1997

[54] ELECTRIC MOTOR DRIVE SYSTEM

[75] Inventor: Gerhard Schoeffler, Baden-Baden, Germany

[73] Assignee: Robert Bosch GmbH, Stuttgart, Germany

[21] Appl. No.: 362,560

[22] PCT Filed: Apr. 16, 1994

[86] PCT No.: PCT/DE94/00420

§ 371 Date: Jan. 3, 1995

§ 102(e) Date: Jan. 3, 1995

[87] PCT Pub. No.: WO94/27349

PCT Pub. Date: Nov. 24, 1994

[30] Foreign Application Priority Data

May 7, 1993 [DE] Germany .................... 43 15 182.5

[51] Int. Cl.⁶ .................................................... H02H 5/04
[52] U.S. Cl. .............................................. 361/23; 361/24
[58] Field of Search ........................ 361/23–25, 28–31; 318/563, 565, 566, 466–469

[56] References Cited

U.S. PATENT DOCUMENTS

| | | | |
|---|---|---|---|
| 4,345,288 | 8/1982 | Kampf et al. | 361/31 |
| 5,105,132 | 4/1992 | Sakamoto et al. | 318/469 |
| 5,323,287 | 6/1994 | Peter | 361/24 |
| 5,373,205 | 12/1994 | Busick et al. | 361/23 |

FOREIGN PATENT DOCUMENTS

| | | | |
|---|---|---|---|
| 3608555 | 9/1987 | Germany | H02P 7/00 |
| 56-139093 | 10/1981 | Japan | H02P 3/06 |
| 58-030851 | 2/1983 | Japan | B60S 1/08 |

Primary Examiner—Jeffrey A. Gaffin
Assistant Examiner—Ronald W. Leja
Attorney, Agent, or Firm—Spencer & Frank

[57] ABSTRACT

An electric motor drive system with an overload protector for the electric motor (10) is proposed, wherein the electric motor drive receives a signal from an input unit (18) for predetermining a desired position of a movable component. When the overload protector responds, the desired position changes to a predeterminable resting position of the movable component, which is taken by the movable component before the electric motor (10) is switched off. Apart from preventing the thermal destruction of the electric motor (10), the electric motor drive system according to the invention prevents subsequent damage, which could occur due to the fact that the component moved by the electric motor (10) could take an undefined position when an overload of the electric motor (10) occurs.

15 Claims, 2 Drawing Sheets

5,627,710

ELECTRIC MOTOR DRIVE SYSTEM

BACKGROUND OF THE INVENTION

The invention is based on an electric motor drive system with an overload protector for the motor. Electric motor drive systems often contain an overload protector to avoid irreparable thermal damage to the electric motor, which could occur in case of a suddenly occurring force on a component that is to be moved or if obstacles appear in its path.

A protector against thermal overload can be implemented, for example, by means of a temperature sensor which is thermally coupled to the motor winding, with the switching contact of the temperature sensor being disposed in the motor circuit. Another possibility of implementing an overload protector is the monitoring of the speed of the electric motor or of the speed of gear elements. An overload is assumed when a predetermined minimum speed is not reached.

SUMMARY OF THE INVENTION

It is the object of the invention to propose an electric motor drive system having an overload protector, such a motor being particularly suitable for use in an adjustment system that responds to an input for predetermining a desired position of a movable component.

The task is solved by providing a drive system which is characterized in that an input for predetermining a desired position of a movable component is provided, in that a change of the desired position to a resting position takes place when an overload detector emits an overload signal, and in that the motor can only be switched off by means of a switch-off signal after the resting position has been reached.

The electric motor drive system according to the invention offers the advantage that the component which is movable by the motor can move to a predeterminable resting position after the overload protector has responded and that the electric motor can only be switched off once the resting position has been reached. This measure prevents the occurrence of possible subsequent damage. The electric motor drive system according to the invention is suited for use with adjustment systems which are arranged, in particular, in motor vehicles. Examples of such adjustment systems in motor vehicles are a sliding roof/lift-up roof, a seat adjustment, a mirror adjustment, a window lifter or the like. Following the response of the overload protector in these electric motor drive systems, it is ensured that, for example, the sliding roof/lift-up roof or, for example, the window is placed into the closed position.

In a first embodiment it is provided that the overload protector evaluates a speed of the motor.

In another embodiment it is provided that the overload protector responds to the motor temperature. A first alternative provides for the use of a temperature sensor. A second alternative provides for the detection of the electric resistance of the armature winding during a motor operating break, this resistance being temperature-dependent. A particularly advantageous alternative provides that during the on period of the electric motor its power loss or a quantity that is proportional to the latter is calculated and integrated on the basis of measured motor data and that the result of the integration is compared to a predetermined threshold value. The advantage of the last alternative is that, for the detection of the overload case, no sensors are used but only motor data and operating data which are known anyway.

Further advantageous modifications and improvements of the electric motor drive system according to the invention will be apparent from the description that follows.

DESCRIPTION OF THE PREFERRED EMBODIMENTS

Figure 1:
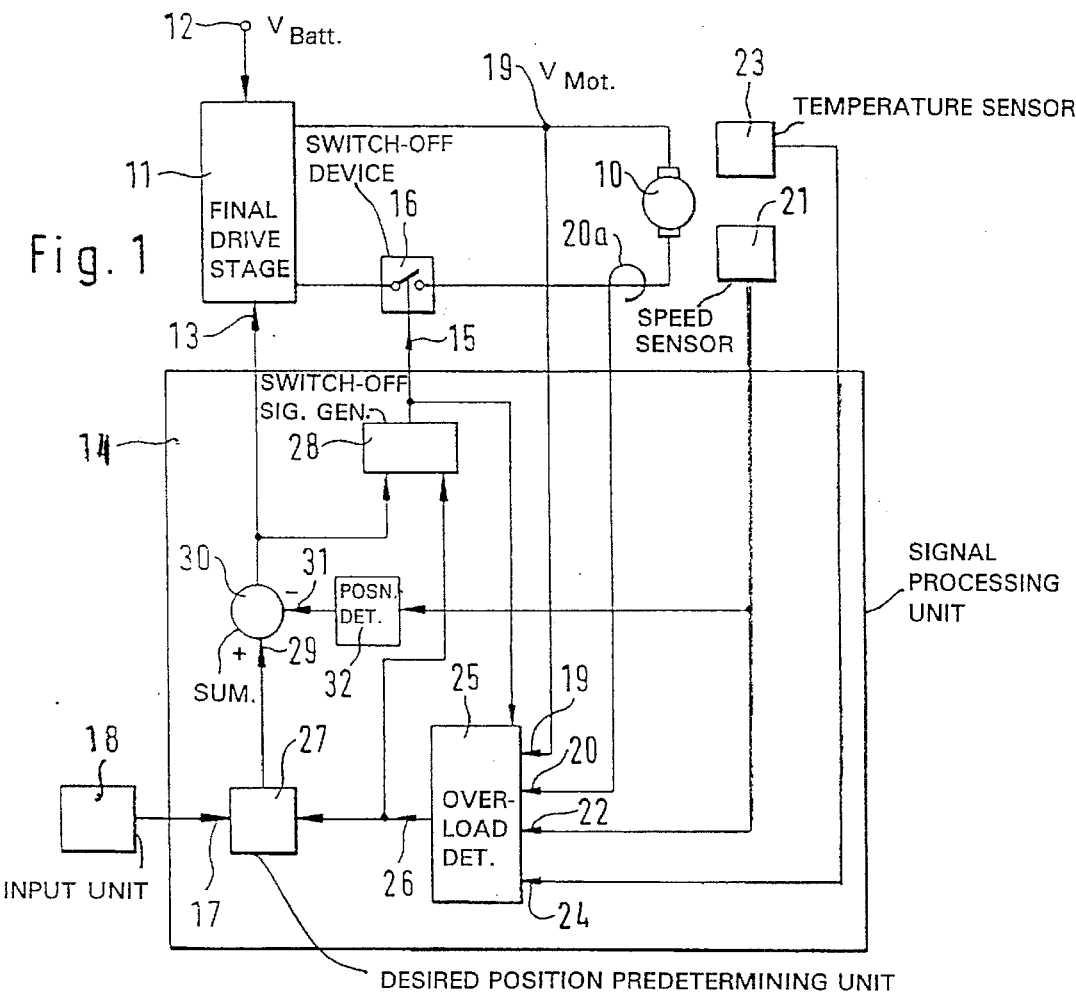
FIG. 1 shows a block circuit diagram of an electric motor drive system according to the invention.

FIG. 1 shows an electric motor 10 which drives a movable component, not shown in detail, within an electric motor drive system. The electric motor 10 is connected to a final drive stage 11 containing switching means, not identified in detail, which enable a left-hand rotation and a right-hand rotation of the electric motor 10. The final drive stage 11 is connected to a terminal 12 that receives a voltage $V_{Batt.}$ from an energy source, which provides the electric energy for the operation of the electric motor 10. To the final drive stage 11 is fed a control signal 13 which is emitted by a signal processing unit 14. The unit 14 furthermore emits a switching-off signal 15 to a switch-off device 16 disposed in the motor circuit.

The signal processing unit 14 is fed a desired position signal 17 by an input unit 18, a motor voltage signal ($V_{Mot.}$), a motor current signal 20, a speed signal 22 emitted by a speed sensor 21, and a temperature signal 24 emitted by a temperature sensor 23.

The motor voltage signal 19, the motor current signal 20, the speed signal 22 and the temperature signal 24 respectively reach an overload detector 25 which emits an overload signal 26 to a desired position predetermining unit 27 and to a switch-off signal generator 28.

The desired position predetermining element 27 is fed the desired position signal 17. A desired position signal 29, emitted by the desired position predetermining unit 27, is received by a summator 30. The summator 30 also receives an actual position signal 31 which is detected by a position detector 32 as a function of the speed signal 22. The control signal 13 is emitted by the summator 30.

The switch-off signal generator 28 emits the switch-off signal 15. In addition to the overload signal 26, the switch-off signal generator 28 is also fed the control signal 13.

The electric motor drive system according to the invention will now be explained in greater detail by way of the block circuit diagram illustrated in FIG. 1:

The electric motor drive system according to the invention is provided, for example, in an adjustment system for a movable component which is preferably arranged in a motor vehicle. The motor vehicle battery supplies the voltage $V_{Batt.}$ to terminal 12. The electric motor 10, operated by the onboard power supply system of the motor vehicle, is configured, for example, as a commutator motor which is actuated by the signal processing unit 14, preferably a microcomputer, via the final drive stage 11. A desired position of the movable component can be predetermined via the input unit 18 for the signal processing unit 14. As input unit 18, for example, a proportional transmitter displaying a direct relation to the desired position that is to be taken by the movable component can be provided. Instead of such a proportional transmitter, an input unit 18 with push-buttons may also be provided. The electric motor 10 is put into motion in the direction prescribed by the respective push-button. In general, the movement is maintained until the push-button is released. It is essential for the invention that a desired position of the movable component can be predetermined at least approximately, during which process the position of the movable component may be either controlled only or also regulated. The block circuit diagram in FIG. 1 shows the most-expansive configuration of the electric motor drive system within an adjustment system. In the summator 30, the desired position signal 29 emitted by the desired position predetermining unit 27 is compared to the actual position signal 31 emitted by the actual position detector 32. If the actual signal deviates from the desired signal, a corresponding control signal 13 is emitted to the final drive stage 11, said control signal prompting the electric motor 10 to move the component until the control deviation has become zero. The actual position detector 32 detects the position of the movable component, for example, from the speed signal 22 emitted by the speed sensor, with the production of a reference signal not being explained in detail in this context.

The overload detector 25 detects an overload of the electric motor 10, for example, as a function of the speed signal 22, by way of a comparison with a predetermined minimum speed. In another embodiment, which may possibly be provided in addition, the overload detector 22 detects an overload of the electric motor 10 from the temperature signal 24 emitted by the temperature sensor 23. The temperature sensor 23 detects, for example, the temperature of the motor winding or at least a temperature occurring at the electric motor 10 which is representative of the motor load. The temperature signal 24 is compared to a predetermined limiting temperature. In other embodiments, the operating motor voltage and/or the motor current signal 20 sensed by the motor current sensor 20a is/are utilized for detecting the overload of the electric motor 10. Particularly advantageous implementations of these overload detectors are explained below in greater detail by way of the FIGS. 2 and 3.

When the overload detector 25 detects an overload, it emits the overload signal 26. Initially, the overload signal 26 effects a change in the desired position predetermined by the user of the electric motor drive. The desired position predetermining unit 27 is prompted to predetermine a resting position for the movable component which the movable component is to take before the final switch-off of the electric motor 10. In a window lifter or, for example, for a sliding roof/lift-up roof, these are the positions in which the openings are closed. In other adjustment systems, for example, in seat adjustments or mirror adjustments, the resting positions preferably are middle positions. The overload signal 26, which is also fed to the switch-off signal generator 28, only results in a switch-off of the electric motor 10 via the switch-off device 16, if it can be deducted from the control signal 13 that the movable component has reached the predetermined resting position. Instead of the drive system illustrated in FIG. 1, a simpler configuration is conceivable in which the position of the movable component is present as a counting result of a counter. Instead of the desired position change by means of the overload signal 26, the final drive stage 11 is actuated in this simple embodiment until the state of the counter corresponds to a predetermined value, for example, until it has reached the value zero, which corresponds to the resting position.

In an even simpler embodiment, even the actual position detection from the speed signal 22 is deleted. In this simpler embodiment, the resting position is given, for example, in that the movable component pushes against a mechanical stop, during which process a higher motor current occurs, which is sensed by the motor current sensor 20a. In this embodiment, the actual position detector 32 detects the reaching of the resting position from the motor current signal 20 by comparing the motor current signal 20 to a predetermined limit value.

The switch-off device 16 in the motor circuit illustrated in FIG. 1 is merely shown by way of example. In alternative embodiments it is possible to shut down the final stage 11 via the control signal 13.

An alternative embodiment of the overload detector, which has already been pointed out, provides that during the on period of the electric motor 10 its power loss $P_{Mot}$ or a quantity proportional to the latter is calculated by means of appropriate motor data and integrated. As soon as the integration value reaches or exceeds a predetermined threshold value, the overload signal 26 is emitted. For the calculation of the motor power loss $P_{Mot}$, first the speed signal 22 can be used. Moreover, the motor voltage is acquired via the motor voltage signal 19. It must generally be assumed that the motor voltage impressed on motor 10 corresponds to the voltage $V_{Batt}$ of the energy source. The motor power loss $P_{Mot}$ is thus calculated according to $$P_{Mot} = (V_{Batt.} - C \cdot \Phi \cdot n)^2 / R_A \qquad (1)$$

Here, $R_A$ is the resistance of the armature winding of the electric motor 10 and $c \cdot \Phi$ is the field-dependent space permeability of the electric motor 10. The space permeability can be calculated according to the motor characteristic $$C \cdot \Phi = V_0 / n_0 \qquad (2)$$

wherein $n_0$ is the no-load speed of the electric motor 10 and $V_0$ is the terminal voltage of the electric motor 10 in no-load operation.

Figure 2:
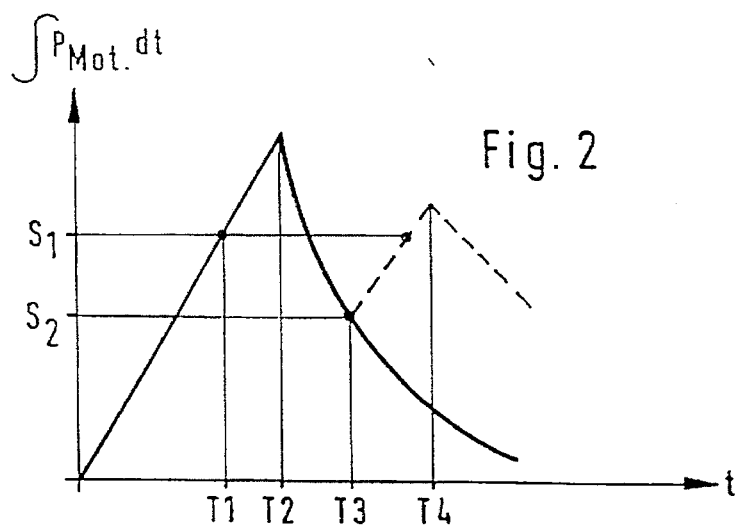
FIG. 2 illustrates a signal course within an overload protector of the electric motor drive system.
Figure 3:
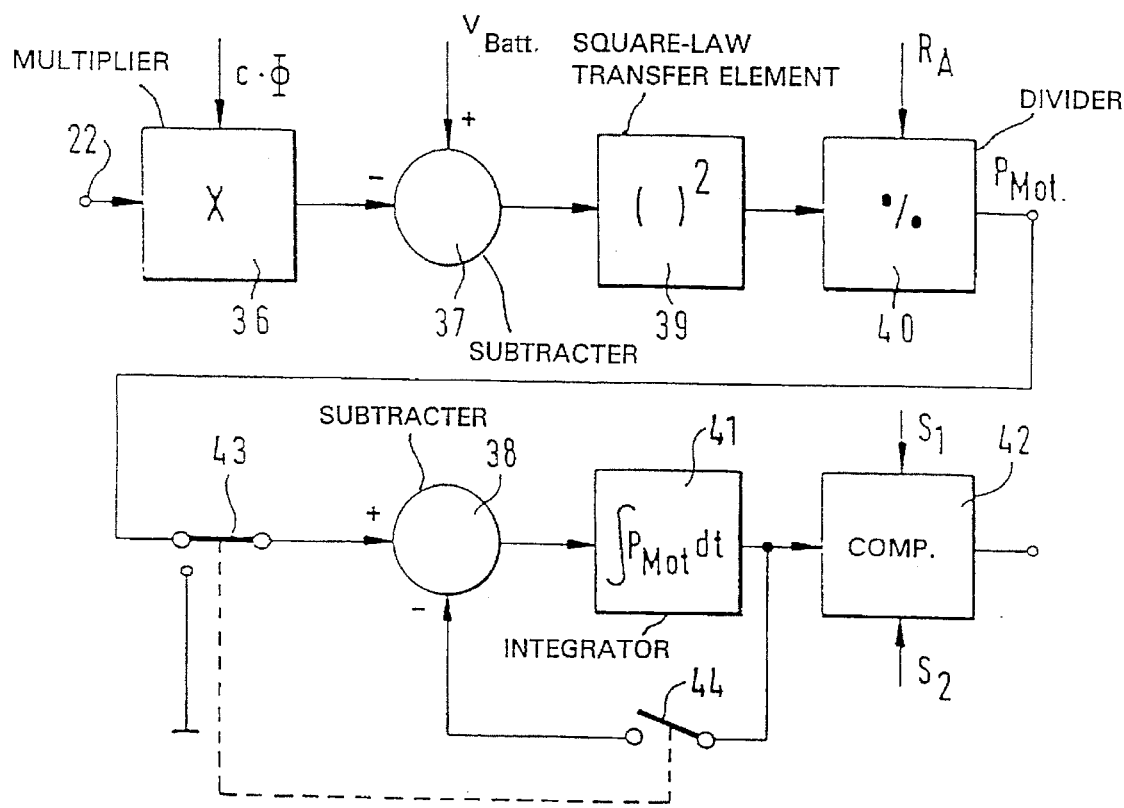
FIG. 3 shows a block circuit diagram of an embodiment of an overload protector.

The motor power loss $P_{Mot}$ is now integrated throughout the entire on period of the electric motor 10. The integration value, which is a measure of the thermal load of the motor, is illustrated in FIG. 2 as a function of the on period. As soon as the integration value reaches or exceeds a first predetermined threshold $S_1$ at the time $T_1$, the overload signal 26 is generated. If the movable component driven by the electric motor 10 has not taken its resting position purely accidentally, some time will still pass, following the time $T_1$, until the time $T_2$ is reached, at which time the electric motor 10 is switched off by means of the switch-off signal 15. The reaching of the time $T_2$ is synonymous to reaching the predetermined resting position of the movable component. Since the switching off of the electric motor 10 initiates a cooling process, this cooling process is simulated in that the integration value is lowered as of the switch-off time $T_2$, preferably according to an exponential function. The approximation by means of an exponential function best approximates the actual temperature course. When the integration value reaches a second predetermined threshold $S_2$, the electric motor 10 can be switched on again—in so far as it does not remain switched off for other reasons—and the afore-described integration procedure starts anew, until the first threshold $S_1$ is reached again and until the overload signal 26 is again emitted. The integration course illustrating the case where the electric motor 10 is switched back on immediately after the threshold $S_2$ at the time $T_3$ has been reached is shown in FIG. 2 with a dashed line. At the time $T_4$, the movable component has again reached its predetermined resting position and the electric motor 10 can be switched off again.

The individual steps for the detection of the overload signal 26 in the overload detector 25 are carried out in a logic arrangement integrated in the signal processing unit 14. A hardware embodiment of this logic arrangement is illustrated as a block circuit diagram in FIG. 3.

The logic arrangement comprises a multiplier 36, two subtracters 37, 38, a square-law transfer element 39, a divider 40, an integrator 41 and a comparator 42. In the multiplier 16, the speed signal 22 is multiplied by the constant factor c·Φ. In the first subtracter 37, this product is subtracted from the motor voltage $V_{mot}$, and the result is squared in the square-law transfer element 39. The difference squared is divided in the divider 40 by the constant $R_A$. The output signal of the divider 40 is the motor power loss $P_{Mot}$. This signal is fed via a first switch 43 to the second subtracter 38. The output of the second subtracter 38 is present at the input of the integrator 41 whose output is connected to the input of the comparator 42. The comparator 42, which is, for example, configured as a window comparator, is provided with the two preset thresholds $S_1$ and $S_2$. The output of the integrator 41 is fed back to the inverting input of the second subtracter 38 via a second switch 44. The two switches 43, 44 are switched synchronously with each other, namely in such a manner that the first switch 43 closes and the second switch 44 opens when the electric motor 10 is switched on, and the second switch 44 closes and zero is supplied to the first switch 43 when the electric motor 10 is switched off by means of the switch-off signal 15 or by means of another switching measure.

As soon as the electric motor 10 is switched on, the component parts 36 through 40 continuously calculate the motor power loss $P_{Mot}$ according to equation (1). The motor power loss $P_{Mot}$ is applied directly to the integrator 41 via the closed switch 43, since the second subtracter 38 has no function because of the opened second switch 44. The motor power loss $P_{Mot}$ is integrated up in the integrator 41, and the integration value present at the output of the integrator 41 is fed to the comparator 42. If the integration value exceeds the upper threshold $S_1$, the overload signal 26 appears at the output of comparator 42, and if the integration value does not reach the threshold $S_2$, and the comparator 42 takes back the overload signal 26.

Instead of the calculation and integration of the motor power loss $P_{Mot}$, a quantity that is proportional to the motor power loss can also be processed in the manner described. Such a quantity is, for example, the power loss $P_{Mot}$ multiplied by the armature resistance $R_A$ according to $$(P_{Mot} \cdot R_A) = (V_{Mot} - C \cdot \Phi \cdot n)^2 \qquad (3)$$

In this case, only the thresholds $S_1$ and $S_2$ must be changed accordingly in the comparator 44, namely in such a manner that when the permissible temperature limit of the electric motor 10 is reached, the proportional quantity reaches the value of the upper threshold $S_1$. The divider 40 can then be omitted.

The logic arrangement may be configured with analog component parts, but it is preferably executed with digital techniques. In this case, the calculated motor power loss $P_{Mot}$ is scanned at fixed time intervals, and the scanning values are summed up in an adder or sum memory. But the motor power loss $P_{Mot}$ can also be respectively calculated anew at fixed time intervals, and the calculated values can be summed up. In both cases, one obtains an integration value which is compared to the thresholds $S_1$ and $S_2$. The integration value simulates the temperature of the electric motor 10 so that, when the upper threshold $S_1$ is reached or exceeded, the motor is switched off after the resting position of the movable component has been reached, before the motor is thermally overloaded.

The detection of the thermal overload is not limited to the afore-described embodiment. Thus, the detection of the overload must not be realized only by way of the hardware logic but may also be realized by way of a computing program that carries out the individual steps, the program being integrated in the signal processing unit 14.

The use of the speed signal 22 of the electric motor 10 for calculating the motor power loss $P_{Mot}$ is particularly advantageous because adjustment systems for the movable component normally are provided with a corresponding speed sensor, for example, a Hall effect sensor, and thus the speed is available without additional expenditure. If certain adjustment systems dispense with such sensors 21, the motor power loss $P_{Mot}$ can also be calculated on the basis of the detected motor current signal 20 according to $$P_{Mot} = I^2 \cdot R_A. \qquad (4)$$

The motor current I can be acquired easily by means of the motor current sensor 20a, preferably by an inductive sensor.

Instead of the power loss, a quantity proportional to the latter can also be calculated, for example, the quantity $P_{Mot} \cdot R_A$, so that, for the simulation of the motor temperature, only the measured motor current I must be squared and integrated.

I claim:

1. A drive system for an electric motor which moves a movable component, comprising:

an input unit to determine a desired position for the movable component;

overload detection means for detecting a motor overload from the motor temperature and for generating an overload signal in response to the overload; and control means for actuating the motor to move the movable component toward the desired position, and for replacing the desired position with a predetermined resting position if the overload signal is generated and then switching the motor off only after the resting position has been reached, even if the overload signal continues to be present during movement of the movable component to the resting position.

2. A drive system as defined in claim 1, wherein the overload detection means comprises at least one speed sensor.

3. A drive system as defined in claim 1, wherein the overload detection means comprises at least one temperature sensor to acquire the motor temperature.

4. A drive system as defined in claim 1, wherein the overload detection means comprises means for finding the temperature of the motor by calculating the power consumption of the motor or a quantity that is proportional to the power consumption, based on motor data, and integrating the power consumption or quantity that is proportional to the power consumption during the on period of the motor to provide an integration value, and means for comparing the integration value to a predetermined threshold value.

5. A drive system as defined in claim 4, wherein the power consumption of the motor is calculated at fixed time intervals and the integration value is obtained through summed up calculated values.

6. A drive system as defined in claim 4, wherein the motor is operated on a direct voltage supply system, wherein the motor's speed (n) is measured, and wherein the power consumption ($P_{Mot}$) of the motor is calculated according to $$P_{Mot} = (V_{Mot} - C \cdot \Phi \cdot n)^2 / R_A$$

where $R_A$ is the resistance of the armature winding, $c \cdot \Phi$ is the field-dependent space permeability, and $V_{Mot}$ is the voltage across the electric motor.

7. A drive system as defined in claim 4, wherein the motor is operated on a direct voltage supply system, wherein the motor's speed (n) is measured, and wherein a quantity ($P_{Mot} \cdot R_A$) that is proportional to the power consumption ($P_{Mot}$) of the motor is calculated according to $$(P_{Mot} \cdot R_A) = (V_{Mot} - C \cdot \Phi \cdot n)^2$$

where $V_{Mot}$ is the voltage across the motor, $c \cdot \Phi$ is the field-dependent space permeability of the motor, and $R_A$ is the resistance of the armature winding of the motor.

8. A drive system as defined in claim 4, wherein the motor is operated on a direct voltage supply system, wherein the motor's current (I) is measured, and wherein the quantity that is proportional to the power consumption ($P_{Mot}$) of the motor is calculated according to $$P_{Mot} = I^2 \cdot R_A$$

where $R_A$ is the resistance of the armature winding of the motor.

9. A drive system as defined in claim 1, wherein the movable component is part of a motor vehicle having an adjustment system for adjusting the position of the movable component, the adjustment system comprising the motor and the drive system.

10. A drive system for an electric motor which moves a movable component, comprising:
   an input unit to determine a desired position for the movable component;
   overload detection means for detecting a motor overload, the overload detection means including
      first means for finding the power consumption of the motor or a quantity that is a function of the power consumption,
      second means for integrating the power consumption or the quantity that is a function of the power consumption to find an integration value, and
      third means for comparing the integration value to a predetermined value; and
   control means for actuating the motor to move the movable component toward the desired position, for turning the motor off within a limited time period if a motor overload is detected, and for causing the motor to move the movable component toward a predetermined resting position during the limited time period if a motor overload is detected, even if the motor overload continues during movement of the movable component toward the resting position.

11. A drive system according to claim 10, wherein the first means comprises means for sensing the motor's speed, and means for calculating the power consumption of the motor according to the formula $$P_{Mot} = (V_{Mot} - C \cdot \Phi \cdot n)^2 / R_A$$

where $P_{Mot}$ is the power consumption of the motor, $V_{Mot}$ is the voltage across the motor, $c \cdot \Phi$ is a constant, n is the motor's speed, and $R_A$ is the resistance of the armature winding of the motor.

12. A drive system according to claim 10, wherein the first means comprises means for sensing the motor's speed, and means for calculating a quantity $P_{Mot} \cdot R_A$ that is a function of the power consumption according to the formula $$(P_{Mot} \cdot R_A) = (V_{Mot} - C \cdot \Phi \cdot n)^2.$$

where $P_{Mot}$ is the power consumption of the motor, $R_A$ is the resistance of the armature winding of the motor, $V_{Mot}$ is the voltage across the motor, $c \cdot \Phi$ is a constant, and n is the motor's speed.

13. A drive system according to claim 10, wherein the first means comprises means for sensing the current drawn by the motor, and means for calculating the power consumption of the motor according to the formula $$P_{Mot} = I^2 \cdot R_A$$

where $P_{Mot}$ is the power consumption of the motor, I is the current drawn by the motor, and $R_A$ is the resistance of the armature winding of the motor.

14. A drive system according to claim 10, wherein the first means comprises means for sensing the motor's speed, and means for calculating the power consumption or a quantity that is a function of the power consumption using a formula which includes the motor's speed as a variable.

15. A drive system according to claim 10, wherein the first means comprises means for sensing the current drawn by the motor, and means for calculating the power consumption or a quantity that is a function of the power consumption using a formula which includes the current drawn by the motor as a variable.

* * * * *